United States Patent
Ogura et al.

(10) Patent No.: US 10,205,993 B2
(45) Date of Patent: Feb. 12, 2019

(54) CONTROLLING PROJECTION OF A SCREEN

(75) Inventors: Tomotaka Ogura, Tokyo (JP); Katsumi Ikuta, Tokyo (JP)

(73) Assignee: Sony Corporation, Tokyo (JP)

( * ) Notice: Subject to any disclaimer, the term of this patent is extended or adjusted under 35 U.S.C. 154(b) by 391 days.

(21) Appl. No.: 13/235,420

(22) Filed: Sep. 18, 2011

(65) Prior Publication Data

US 2012/0075265 A1 Mar. 29, 2012

(30) Foreign Application Priority Data

Sep. 27, 2010 (JP) .................................. 2010-214655

(51) Int. Cl.
| | |
|---|---|
| H04N 21/4402 | (2011.01) |
| H04N 21/442 | (2011.01) |
| H04N 9/31 | (2006.01) |
| H04N 21/422 | (2011.01) |
| H04N 21/4223 | (2011.01) |

(52) U.S. Cl.
CPC ... *H04N 21/440263* (2013.01); *H04N 9/3185* (2013.01); *H04N 9/3194* (2013.01); *H04N 21/4223* (2013.01); *H04N 21/42202* (2013.01); *H04N 21/442* (2013.01)

(58) Field of Classification Search
USPC .......... 345/204–215, 690–699; 715/243–251
See application file for complete search history.

(56) References Cited

U.S. PATENT DOCUMENTS

| | | | | |
|---|---|---|---|---|
| 6,577,330 | B1* | 6/2003 | Tsuda et al. | 715/782 |
| 2002/0033848 | A1* | 3/2002 | Sciammarella et al. | 345/838 |
| 2004/0223120 | A1* | 11/2004 | Tan | 353/30 |
| 2004/0246272 | A1* | 12/2004 | Ramian | 345/660 |
| 2006/0069808 | A1* | 3/2006 | Mitchell et al. | 709/246 |
| 2006/0121961 | A1* | 6/2006 | Cho | G02B 6/0076 455/575.3 |
| 2007/0176851 | A1* | 8/2007 | Willey | G02B 26/101 345/32 |
| 2007/0186178 | A1* | 8/2007 | Schiller | 715/769 |
| 2008/0012880 | A1* | 1/2008 | Plut | 345/660 |
| 2008/0059893 | A1* | 3/2008 | Byrne et al. | 715/757 |
| 2008/0152297 | A1* | 6/2008 | Ubillos | G11B 27/034 386/333 |
| 2008/0212039 | A1* | 9/2008 | Taylor | 353/79 |

(Continued)

FOREIGN PATENT DOCUMENTS

| | | |
|---|---|---|
| JP | 10-161621 A | 6/1998 |
| JP | 2000-122777 A | 4/2000 |

(Continued)

OTHER PUBLICATIONS

Extended Search Report dated Jan. 6, 2012 in European Patent Application No. 11181925.6-2202.

(Continued)

*Primary Examiner* — William Lu
(74) *Attorney, Agent, or Firm* — Chip Law Group

(57) ABSTRACT

A projection device includes a projection unit configured to project a screen, a distance detection unit configured to detect a projection distance of the screen, and a control unit configured to control the amount of information on the screen according to the projection distance detected by the distance detection unit.

23 Claims, 15 Drawing Sheets

(56) References Cited

U.S. PATENT DOCUMENTS

| | | | |
|---|---|---|---|
| 2008/0235574 A1* | 9/2008 | Telek et al. | 715/240 |
| 2009/0080020 A1* | 3/2009 | Kitagawa | 358/1.15 |
| 2009/0091710 A1* | 4/2009 | Huebner | 353/28 |
| 2009/0251622 A1* | 10/2009 | Mitsuhashi et al. | 348/745 |
| 2009/0310036 A1* | 12/2009 | Jung et al. | 348/744 |
| 2010/0014056 A1* | 1/2010 | Mitsuhashi et al. | 353/69 |
| 2010/0033582 A1* | 2/2010 | Maeng et al. | 348/207.99 |
| 2010/0037174 A1* | 2/2010 | Muser et al. | 715/784 |
| 2010/0079468 A1* | 4/2010 | Pance et al. | 345/501 |
| 2010/0093399 A1* | 4/2010 | Kim et al. | 455/566 |
| 2010/0128231 A1* | 5/2010 | Furui | 353/70 |
| 2010/0199232 A1* | 8/2010 | Mistry et al. | 715/863 |
| 2010/0269062 A1* | 10/2010 | Kobylinski | 715/781 |
| 2010/0315491 A1* | 12/2010 | Carter et al. | 348/51 |
| 2010/0328453 A1* | 12/2010 | Kiesshauer | 348/135 |
| 2011/0197147 A1* | 8/2011 | Fai | 715/753 |
| 2011/0205147 A1* | 8/2011 | Wilson et al. | 345/156 |
| 2013/0050206 A1* | 2/2013 | Willis et al. | 345/419 |

FOREIGN PATENT DOCUMENTS

| | | |
|---|---|---|
| JP | 2005-275327 | 10/2005 |
| JP | 2006-091112 A | 4/2006 |
| JP | 2006-332938 A | 12/2006 |
| JP | 2008-211409 | 9/2008 |
| JP | 2009-105645 A | 5/2009 |
| JP | 2010-186188 A | 8/2010 |
| WO | WO 2005/006720 A1 | 1/2005 |
| WO | WO 2010/110391 A1 | 9/2010 |

OTHER PUBLICATIONS

Office Action received for Chinese Patent Application No. 201110279122.5, dated May 16, 2016, 26 pages of office action including 16 Pages of English Translation.

Office Action received for Japanese Patent Application No. 2015-040466, dated Mar. 8, 2016, 5 pages of office action.

Office Action for JP Patent Application No. 2015-040466, dated Oct. 4, 2016, 5 pages of Office Action.

\* cited by examiner

| PROJECTION DISTANCE d (m) | TO 1.0 | 1.0 TO 1.5 | 1.5 TO 2.0 | 2.0 TO |
|---|---|---|---|---|
| NUMBER OF ARRANGED THUMBNAILS | 3 × 3 | 4 × 4 | 5 × 5 | 6 × 6 |

FIG. 18

| PROJECTION DATE AND TIME | TITLE |
|---|---|
| 04/11/2010 | CAT |
| 05/23/2010 | SPORTS EVENT |
| 06/04/2010 | TRAVEL |
| 07/11/2010 | BIRTHDAY |

◀ 1/5 ▶

Ix

| PROJECTION DATE AND TIME | TITLE | REPRODUCTION TIME |
|---|---|---|
| 03/23/2010 | GRADUATION CEREMONY | 25m 10s |
| 04/02/2010 | CHERRY-BLOSSOM VIEWING | 2m 43s |
| 04/11/2010 | CAT | 3m 21s |
| 05/23/2010 | SPORTS EVENT | 34m 10s |
| 06/04/2010 | TRAVEL | 25m 33s |
| 07/11/2010 | BIRTHDAY | 8m 54s |
| 07/31/2010 | FIREWORK | 22m 04s |
| 08/11/2010 | SUMMER VACATION | 1m 54s |

◀ 1/5 ▶

Ix'

FIG. 19
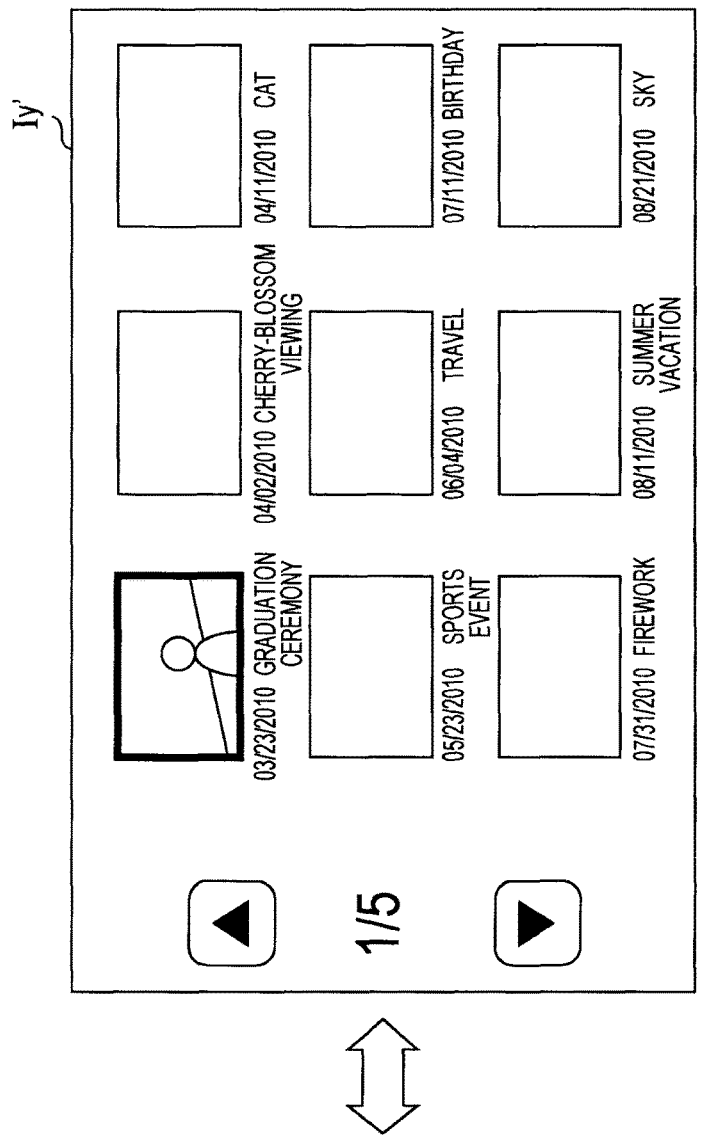
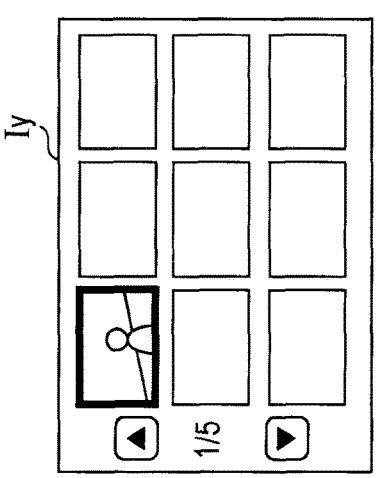

CONTROLLING PROJECTION OF A SCREEN

BACKGROUND

The present disclosure relates to a projection device, a projection control method and a program.

Recently, an imaging device having a small projector mounted therein has been proposed. According to this imaging device, since content acquired by imaging may be projected from the projector, it is possible for many users to view the content without using a display device (for example, see Japanese Unexamined Patent Application Publication No. 2008-211409).

In addition, when an index screen for displaying a list of thumbnails of content is projected from a projector, it is possible for many users to enjoy a process of selecting reproduction content. In such a use case, more thumbnails with sufficiently viewable sizes are preferably included in the projected index screen.

SUMMARY

Regarding this point, if the number of thumbnails for projection is set and an index screen is projected, the set number may be applied to the number of arranged thumbnails. However, if the number of arranged thumbnails is fixed on the index screen, the following problems may occur.

For example, since the size of the thumbnail is proportional to a projection distance, it is difficult to secure visibility of the thumbnail if the projection distance is short. In contrast, if the projection distance is long, since the index screen and the thumbnail are increased, the visibility of the thumbnail is improved, but the number of displayed thumbnails is not increased.

There is a technique of manually changing the number of arranged thumbnails, but manual change is cumbersome to a user.

It is desirable to provide a novel and improved projection device, a projection control method and a program, which are able to automatically change the amount of information on a projection screen.

According to an embodiment of the present disclosure, there is provided a projection device including a projection unit configured to project a screen, a distance detection unit configured to detect a projection distance of the screen, and a control unit configured to control the amount of information on the screen according to the projection distance detected by the distance detection unit.

The control unit may control the amount of information on the screen to be increased as the projection distance is increased.

The control unit may control the amount of information on the screen according to a predetermined relationship between the projection distance and the amount of information.

The screen may include thumbnails of one, or two or more pieces of thumbnail content data, and the control unit may control the number of thumbnails included in the screen according to the projection distance.

The control unit may increase the number of thumbnails from a first number to a second number when the projection distance is greater than a first threshold and decrease the number of thumbnails from the second number to the first number if the projection distance is less than a second threshold less than the first threshold.

The projection device may further include an operation input unit and an operation display unit having a display function and an operation detection function. The operation input unit may receive a user operation if the screen is projected by the projection unit, and the operation display unit may receive a user operation if the screen is displayed by the operation display unit.

The operation display unit may display an induction screen for inducing a user operation for the operation input unit if the screen is projected by the projection unit.

The control unit may not change the current amount of information on the screen if detection of the projection distance by the distance detection unit fails.

The screen may include text information, and the control unit may control the amount of text information included in the screen according to the projection distance.

The projection device may further include an imaging unit, and the distance detection unit may detect the projection distance of the screen from a focal length of the imaging unit.

According to another embodiment of the present disclosure, there is provided a projection control method including projecting a screen, detecting a projection distance of the screen, and controlling the amount of information on the screen according to the projection distance.

According to still another embodiment of the present disclosure, there is provided a program for causing a computer to function as a control unit for controlling the amount of information on a screen according to a projection distance of the projected screen.

As described above, according to the embodiments of the present disclosure, it is possible to automatically change the amount of information on a projection screen.

BRIEF DESCRIPTION OF THE DRAWINGS

FIG. 18 is an explanatory view showing a detailed example of an index screen according to a second embodiment; and FIG. 19 is an explanatory view showing a detailed. example of an index screen according to a third embodiment.

DETAILED DESCRIPTION OF EMBODIMENTS

Figure 1:
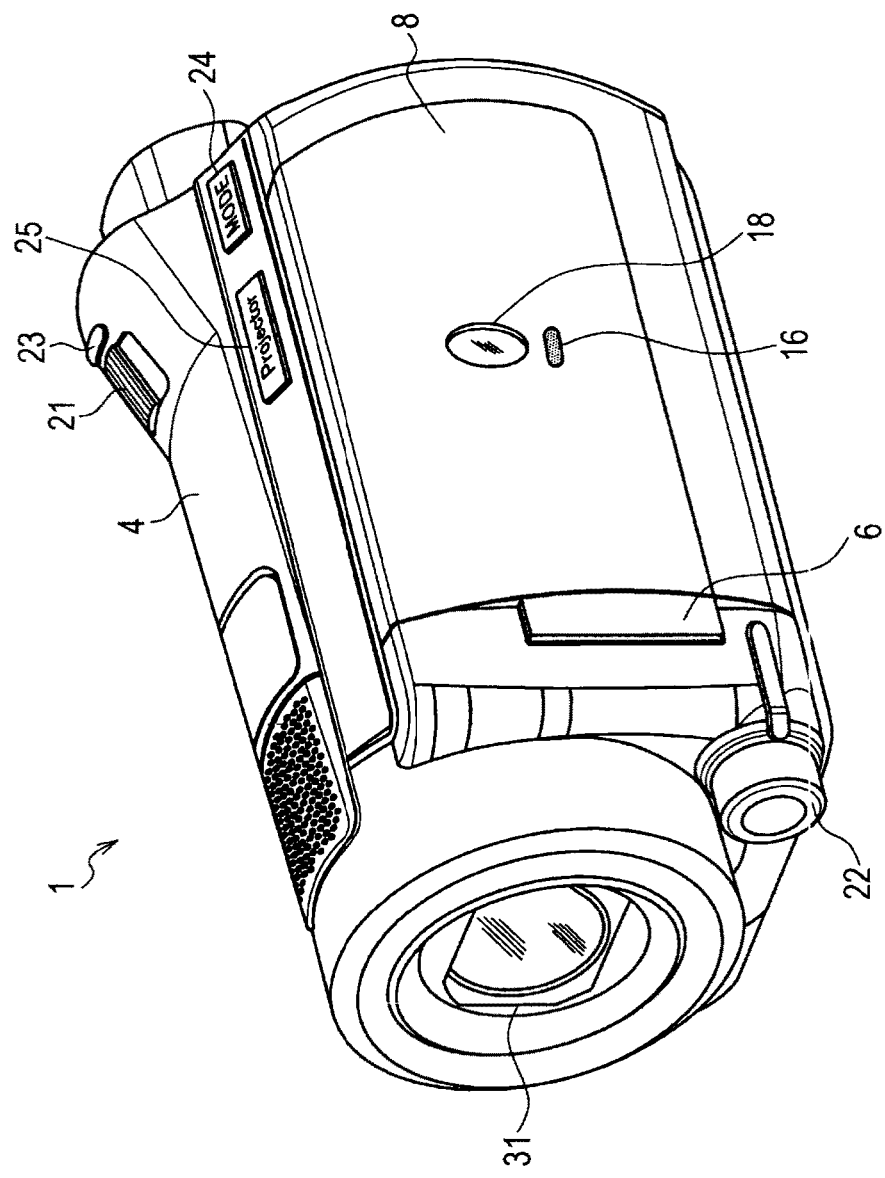
FIG. 1 is a perspective view showing the appearance of an imaging device according to an embodiment of the present disclosure.

Hereinafter, embodiments of the present disclosure will be described in detail with reference to the accompanying drawings. In the present specification and drawings, components having substantially the same functions are denoted by the same reference numerals and a repeated description will be omitted.

In the present specification and drawings, a plurality of components having substantially the same functions may be denoted by the same reference numerals postfixed with different letters. The plurality of components having substantially the same functions is denoted by the same reference numerals only if it is not necessary to distinguish the components.

"DETAILED DESCRIPTION OF EMBODIMENTS" will be described in the following order of items.

1. Basic Configuration of Imaging Device according to Embodiment of Present Disclosure
2. First Embodiment
2-1. Configuration of Imaging Device
2-2. Modified Example of Configuration of Imaging Device
2-3. Operation of Imaging Device
3. Second Embodiment
4. Third Embodiment
5. Overview 1. Basic Configuration of Imaging Device According to Embodiment of Present Disclosure The present disclosure may be variously implemented as described in "2. First embodiment" to "4. Third Embodiment" as an example in detail. An imaging device 1 which is described in each embodiment as an embodiment of a projection device includes:

A: a projection unit (projector module 18) for projecting a screen,

B: a distance detection unit (distance sensor 16) for detecting a projection distance of the screen; and C: a control unit 100 for controlling the amount of information on the screen according to the projection distance detected by the distance detection unit.

Hereinafter, the common basic configuration of the embodiments will be described with reference to FIGS. 1 to 6.

Figure 2:
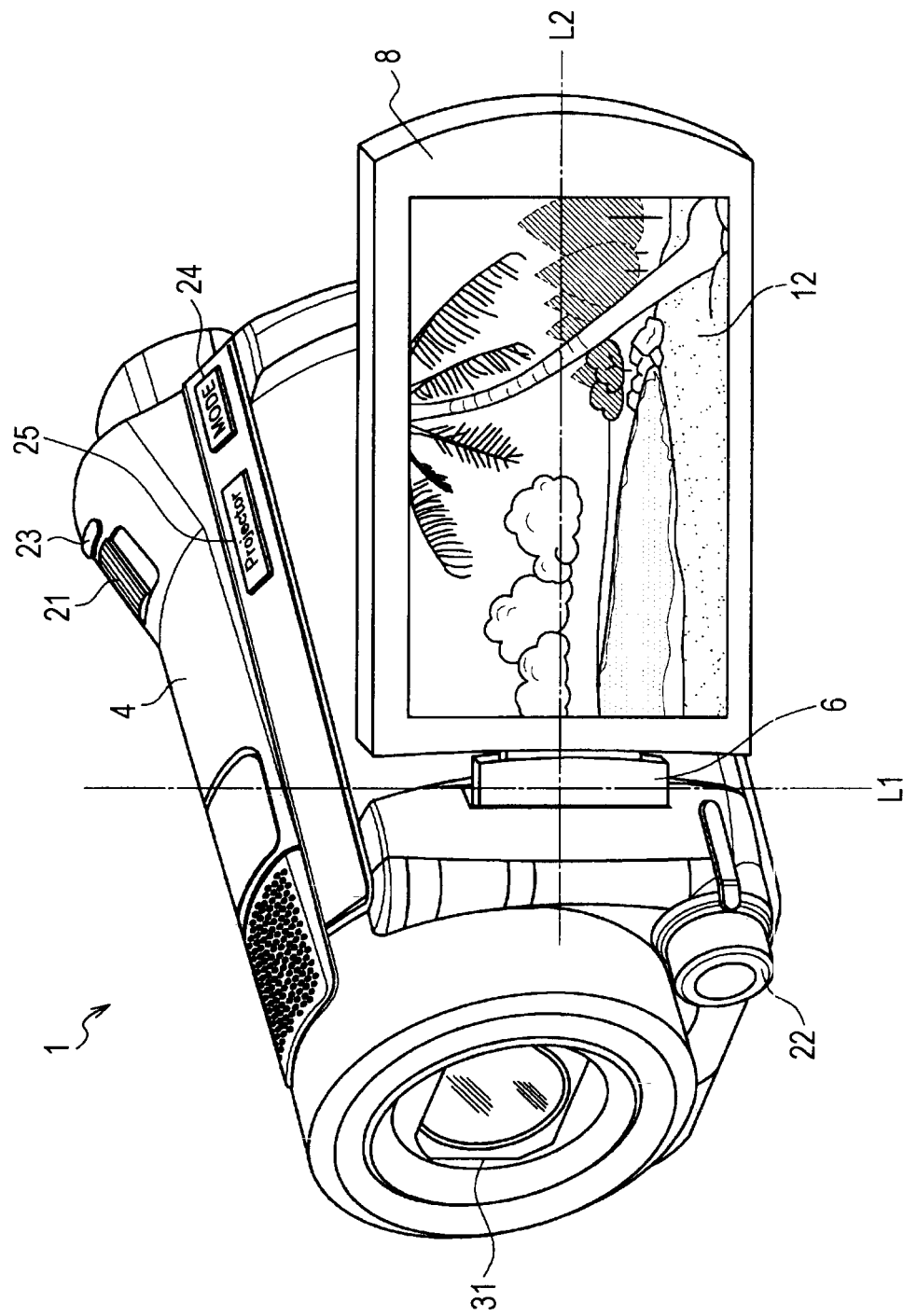
FIG. 2 is a perspective view showing the appearance of an image device according to an embodiment of the present disclosure.

FIGS. 1 and 2 are perspective views showing the appearance of the imaging device 1 according to the embodiment of the present disclosure. As shown in FIG. 1, the imaging device 1 includes a main body 4, a hinge mechanism 6 and an opening/closing unit 8. FIGS. 1 and 2 show the imaging device 1 (video camera) as an example of a projection device, but the projection device is not limited to the related example. For example, the projection device may be an information processing device such as a Personal Computer (PC), a Personal Digital Assistants (PDA), a home game machine, a mobile phone, a Personal Handyphone System (PHS), a portable music reproduction device, a portable image processing device or a portable game machine.

The main body 4 of the imaging device 1 includes a zoom operation unit 21, a manual operation unit 22, a still image capturing operation unit 23, a mode operation unit 24, a projection switch operation unit 25 and an imaging optical system 31.

The imaging optical system 31 is an imaging unit which includes a photographing lens and a zoom lens for focusing light emitted from a subject and forms a subject image in a signal conversion unit such as a Charge Coupled Device (CCD) or a Complementary Metal Oxide Semiconductor (CMOS). If the subject image is formed in the signal conversion unit, the subject image is converted into an electrical image signal by the signal conversion unit.

The zoom operation unit 21 receives a user operation for changing a focal length of the imaging optical system 31. The zoom operation unit 21 includes, for example, a lever tiltable to a wide side or a telephoto side, as shown in FIG. 1. In this case, the imaging optical system 31 decreases the focal length (reduces the subject image) if the lever is tilted to the wide side and increases the focal length (enlarges the subject image) if the lever is tilted to the telephoto side.

The manual operation unit 22 receives a user operation for focusing the imaging optical system 31. The manual operation unit 22 includes, for example, a dial which is rotatable in a clockwise or counterclockwise direction, as shown in FIG. 1. In this case, the imaging optical system 31 adjusts a focal position according to a rotation direction or rotation amount of the dial.

The still image capturing operation unit 23 receives a user operation for capturing a still image. The still image capturing operation unit 23 includes, for example, a pressing button, as shown in FIG. 1. In this case, the imaging device 1 captures a still image according to pressing of the button and acquires image data of the still image.

The mode operation unit 24 receives a user operation for switching an operation mode of the imaging device 1. The operation mode of the imaging device 1 is broadly divided into a photographing mode and a reproduction mode as an example. The mode operation unit 24 includes, a pressing button, as shown in FIG. 1. In this case, the operation mode of the imaging device 1 is switched between the photographing mode and the reproduction mode according to pressing of the button.

The photographing mode is an operation mode for operating the imaging optical system 31, the signal conversion unit, and the like and imaging a subject. The reproduction mode is, for example, an operation mode for reproduction image data acquired in the photographing mode. Details of these operation modes will be described below with reference to FIGS. 4 to 6.

The projection switch operation unit 25 receives a user operation for switching whether or not a screen generated by the imaging device 1 is projected from the projector nodule 18. For example, the projection switch operation unit 25 includes, for example, a pressing button as shown in FIG. 1. In this case, the imaging device 1 switches the projection of the screen from the projector module 18 according to pressing of the button. While the screen is projected from the projector module 18, the touch panel 12 may display the same screen as the projection screen or a screen different from the projection screen or may not display the screen.

The configuration of the main body 4 of the imaging device 1 was described above. Subsequently, the configuration of the opening/closing unit 8 connected to the main body 4 through the hinge mechanism 6 will be described.

The opening/closing unit 8 is connected to the main body 4 by the hinge mechanism 6 so as to be rotated around a first rotation axis L1 and around a second rotation axis L2 perpendicular to the first rotation axis L1 shown in FIG. 2. FIG. 1 shows the state in which the opening/closing unit 8 is closed with respect to the main body 4 and FIG. 2 shows the state in which the opening/closing unit 8 is rotated around the first rotation axis L1 so as to be opened with respect to the main body 4.

The opening/closing unit 8 includes a distance sensor 16 and the projector module 18 on one surface thereof as shown in FIG. 1 and includes a touch panel 12 on the other surface thereof, as shown in FIG. 2.

The touch panel 12 is an example of an operation display unit having a display function and an operation detection function. The touch panel 12 may display the image of a subject focused by the imaging optical system 31 in the photographing mode and display the index screen described below, reproduction screen, or the like in the reproduction mode. The user may operate the touch panel 12 so as to input a variety of instructions or information to the imaging device 1.

The distance sensor 16 is disposed on the same surface of the opening/closing unit 8 as the projector module 18 in the same direction as the projection direction of the projector module 18. The distance sensor 16 functions as a distance detection unit for detecting the distance between the projector module 18 and a projection surface, that is, a project distance of an image by the projector module 18. The method of measuring the distance by the distance sensor 16 is not particularly limited thereto. For example, the distance sensor 16 may be an infrared distance sensor for detecting the distance from an object using infrared rays.

The projection module 18 is a projection unit for projecting the screen generated by the imaging device 1. The projector module 18 may project, for example, the index screen described below, reproduction screen, or the like according to a user operation for the projection switch operation unit 25. Hereinafter, the detailed configuration of the projector module 18 will be described with reference to FIG. 3.

Figure 3:
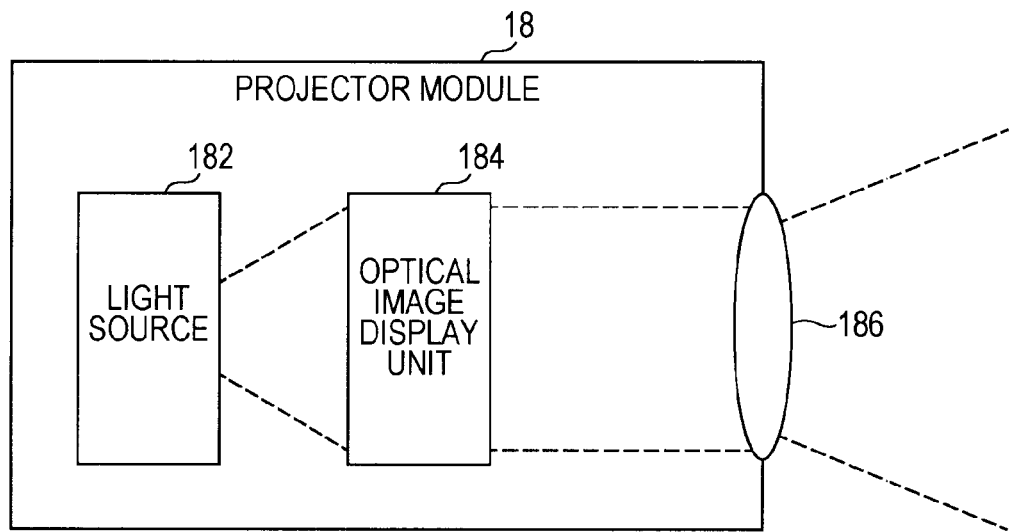
FIG. 3 is an explanatory view showing the configuration of a projector module.

FIG. 3 is an explanatory view showing the configuration of the projector module 18. As shown in FIG. 3, the projection module 18 includes a light source 182, an optical image display unit 184 and a projection lens 186.

The light source 182 includes a white Light Emitting Diode for emitting white light and an optical system for spreading the light emitted from the white LED and emitting to the optical light display unit 184. In the present embodiment, although an example in which the light source 182 includes the white LED is described, the configuration of the light source 182 is not limited to the related example. For example, the light source 182 may be a high-pressure mercury lamp.

The optical light display unit 184 is a liquid crystal panel for displaying a screen to be projected. The screen displayed on the optical image display unit 184 is supplied to the projection lens 186 by the light emitted from the light source 182. The projection lens 186 forms the screen displayed on the optical image display unit 184 on a projection surface.

Photographing Mode and Reproduction Mode

The basic configuration of the imaging device 1 according to the embodiment of the present disclosure was described above. Subsequently, the photographing mode and the reproduction mode which are the operation modes of the imaging device 1 will be described.

Figure 4:
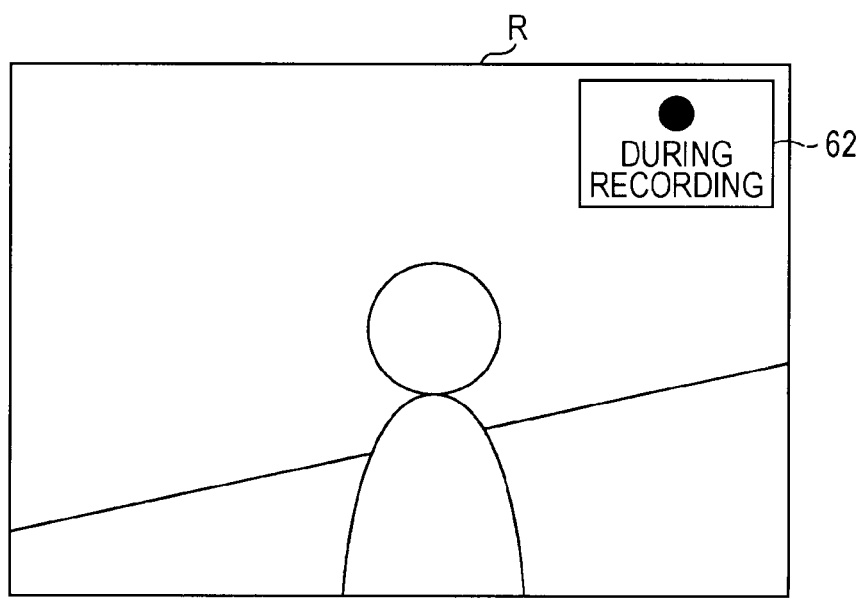
FIG. 4 is an explanatory view showing a detailed example of an imaging screen.

The photographing mode is an operation mode for capturing a subject by operating the imaging optical system 31, the signal conversion unit and the like. In the photographing mode, as shown in FIG. 4, a screen R obtained by capturing the subject by the imaging optical system 31 is displayed on the touch panel 12. In addition, the captured screen R being recorded, a recording mark 62 is attached to the captured screen R as shown in FIG. 4.

When the still image capturing operation unit 24 is pressed by the user in the photographing mode, the imaging device 1 captures a still image of a subject and acquires image data of the still image.

When the mode operation unit 24 is pressed by the user in the photographing mode, the imaging device 1 switches the operation mode to the reproduction mode. The reproduction mode is an operation mode for reproduction content data. The imaging device 1 generates an index screen I for enabling the user to select content data to be played back after switching to the reproduction mode.

Figure 5:
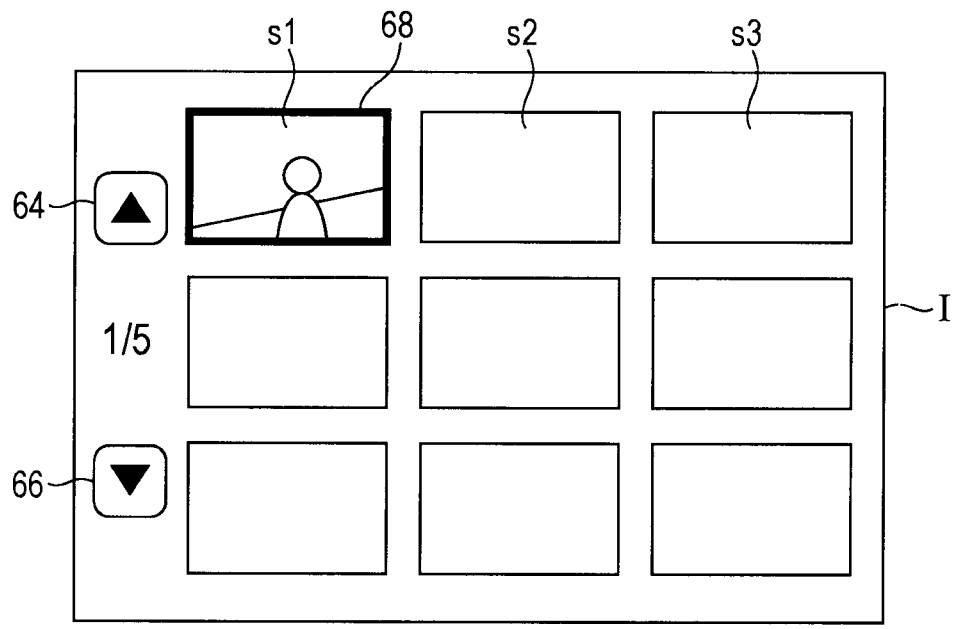
FIG. 5 is an explanatory view showing a detailed example of an index screen.

FIG. 5 is an explanatory view showing a detailed example of the index screen I. As shown in FIG. 5, the index screen I includes thumbnails s1, s2, s3, . . . respectively corresponding to a plurality of pieces of content data. The content data may be image data acquired through capture by the imaging device 1 or externally acquired image data. The data kind of the content data is not limited to image data and the data kind of the content data may be audio data, games, software, or the like. Each thumbnail may be a still image or a moving image.

The index screen I includes an upward scroll button 64 and a downward scroll button 66. The user may select the upward scroll button 64 or the downward scroll button 66 so as to scroll the index screen I in an arbitrary direction.

The user may fit a cursor 68 to a desired thumbnail on the index screen I so as to select content data to be played back. If the selection of the content data is decided by the user, the imaging device 1 starts the reproduction of the selected content data and generates a reproduction screen of the content data.

Figure 6:
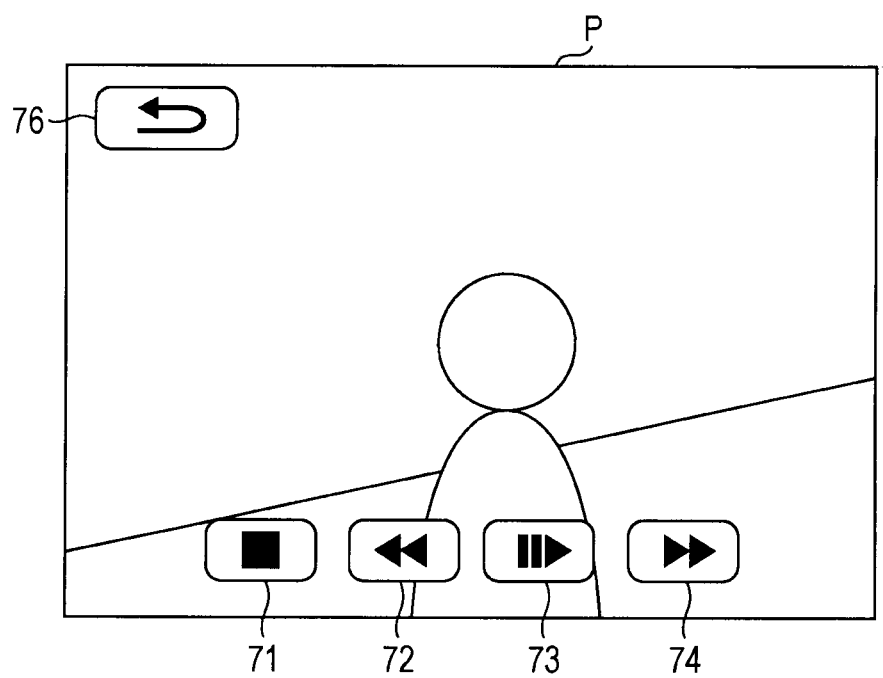
FIG. 6 is an explanatory view showing a detailed example of a reproduction screen.

FIG. 6 is an explanatory view showing a detailed example of a reproduction screen P of content data. As shown in FIG. 6, the reproduction screen P of the content data includes a stop button 71, a rewind button 72, a play/pause button 73, a fast forward button 74 and a return button 76.

When the stop button 71, the rewind button 72, the play/pause button 73 or the fast forward button 74 is selected by the user, the imaging device 1 controls reproduction of the content data according to the selected button. For example, when the stop button 71 is selected by the user, the imaging device 1 stops the reproduction of the content data. When the return button 76 is selected by the user, the imaging device 1 stops the reproduction of the content data and generates the index screen I.

Although an example in which the photographing mode and the reproduction mode are switched by the user operation of the mode operation unit 24 is described above, trigger of the mode switch is not limited to the related example. For example, the imaging device 1 may add a button for switching to the reproduction mode to the captured screen R and switch the operation mode to the reproduction mode when the button for switching to the reproduction is selected by the user. Similarly, the imaging device 1 may add a button for switching to the photographing mode to the index screen I or the reproduction screen P and switch the operation mote to the photographing mode when the button for switching to the photographing mode is selected by the user.

The configuration of the index screen I is not limited to the example shown in FIG. 5. For example, the index screen I may be a screen in which thumbnails of image data are superimposed at a position (for example, a capture position) of a map associated with image data or a screen in which thumbnails of image data are superimposed at a position (for example, a date and time of capture) of a time axis associated with image data.

The imaging device 1 may display the index screen I or the reproduction screen P on the touch panel 12 or project the screen from the projector module 18 in the reproduction mode.

Background of Embodiment of Present Disclosure

When the index screen I is projected from the projector module 18, it is possible for many users to enjoy a process of selecting reproduction content data. In such a use case, for example, more thumbnails with sufficiently viewable sizes are preferably included in the projected index screen.

Regarding this point, if the number of thumbnails for projection is set and the index screen I is projected, the set number may be applied to the number of arranged thumbnails. However, if the number of arranged thumbnails is fixed on the index screen, the following problems may occur.

For example, since the size of the thumbnail is proportional to a projection distance, it is difficult to secure visibility of the thumbnail if the projection distance is short. In contrast, if the projection distance is long, since the index screen I and the thumbnail are increased, the visibility of the thumbnail is improved, but the number of displayed thumbnails is not increased. There is a technique of manually changing the number of arranged thumbnails, but manual change is cumbersome to a user.

In consideration of the above circumstances, the embodiments of the present disclosure are implemented. According to the embodiments of the present disclosure, it is possible to automatically control the amount of information and visibility of a screen according to a projection distance of the screen. Hereinafter, the embodiments of the present disclosure will be described in detail.

2. First Embodiment 2-1. Configuration of Imaging Device

Figure 7:
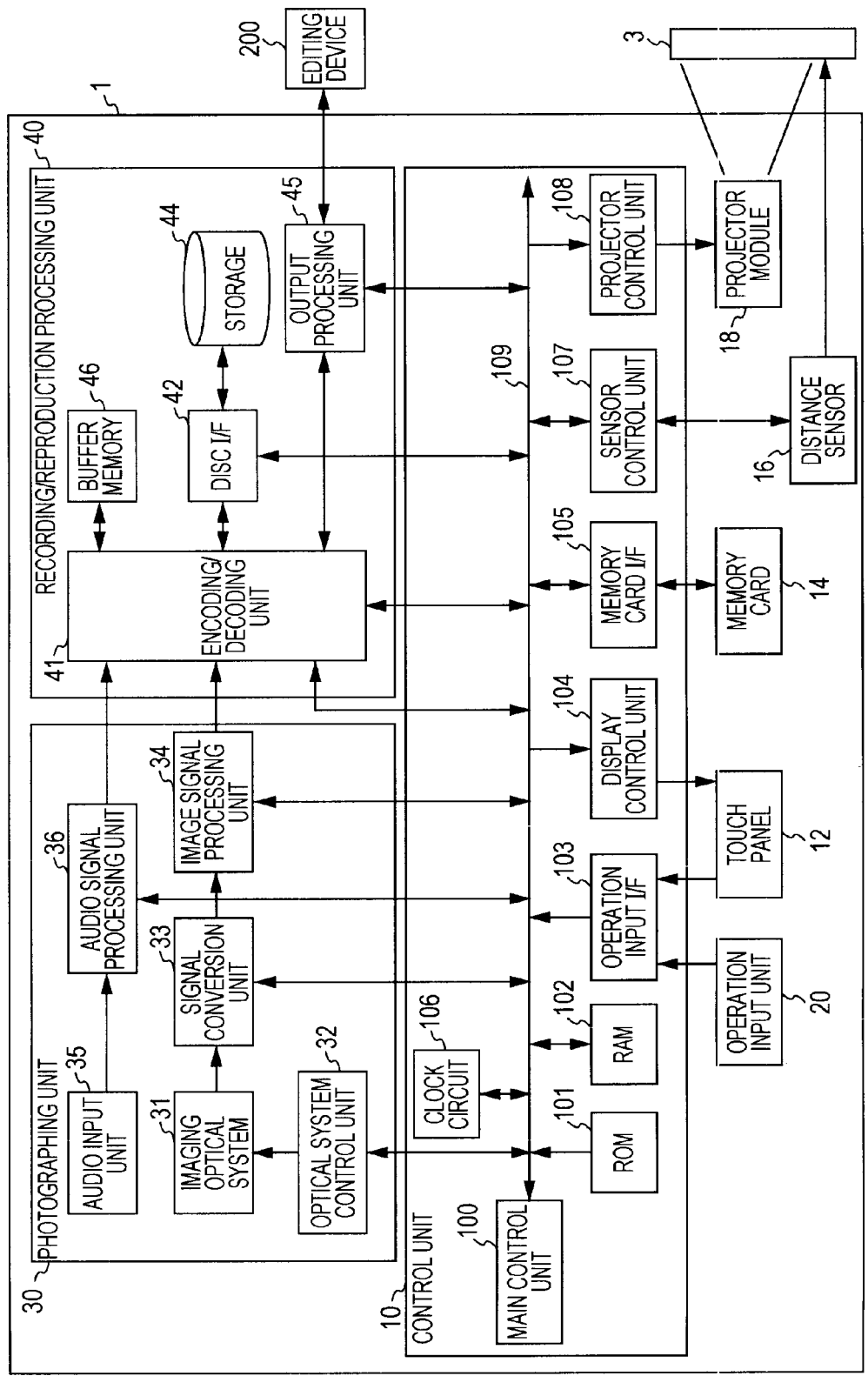
FIG. 7 is a block diagram showing the configuration of an imaging device according to a first embodiment of the present disclosure.

FIG. 7 is a block diagram showing the configuration of the imaging device 1 according to a first embodiment of the present disclosure. As shown in FIG. 7, the imaging device 1 according to the first embodiment of the present disclosure includes a control unit 10, a photographing unit 30 and a recording/reproduction processing unit 40.

The photographing unit (imaging unit) 30 includes an imaging optical system 31, an optical system control unit 32, a signal conversion unit 33, an image signal processing unit 34, an audio input unit 35, and an audio signal processing unit 36.

The imaging optical system 31 includes a lens group for capturing a subject, an aperture adjustment mechanism, a focus adjustment mechanism, a zoom mechanism, a shutter mechanism, a flash mechanism, a handshaking correction mechanism, and the like mounted therein and forms a subject image on the signal conversion unit 33.

The optical system control unit 32 receives a control signal from the control unit 10 and generates a control signal supplied to the imaging optical system 31. The optical system control unit 32 supplies the generated control signal to the imaging optical system 31 and performs control such as zoom control, shutter control, exposure control, and the like.

The signal conversion unit 33 includes, for example, an image element such as a CCD or a CMOS, as described above. When an image read timing signal is supplied from the control unit 10 based on a user operation for the operation input unit 20, the signal conversion unit 33 converts the subject image formed on an imaging surface by the imaging optical system 31 into an electrical image signal and supplies the electrical image signal to the image signal processing unit 34. Since the image read timing signal is continuously supplied from the control unit 10 in the photographing mode, the signal conversion unit 33 continuously performs conversion of the image signal of the subject image so as to acquire an image signal of a plurality of frames.

The image signal processing unit 34 performs a process such as gamma correction or Auto Gain Control (AGC) with respect to the image signal based on the control signal from the control unit 10 and performs a process of converting the image signal to a digital format.

The audio input unit 35 collects audio around of the subject set in the photographing mode. The audio input unit 35 converts the collected audio into an electrical audio signal and supplies the electrical audio signal to the audio signal processing unit 36. The audio signal processing unit 36 performs a process of correction or AGC with respect to the audio signal or a process of converting the audio signal into a digital format, based on the control signal from the control unit 10.

The recording/reproduction processing unit 40 includes an encoding/decoding circuit 41, a disc interface 42, a storage device 44, an output processing unit 45 and a buffer memory 46 as shown in FIG. 7 and functions as a reproduction unit and a recording unit.

The encoding/decoding unit 41 has an encoding function for encoding and multiplexing the image signal and the audio signal supplied from the photographing unit 30 or additional recording information such as time information according to an MPEG scheme or the like and performs conversion into compression data including the image data and the audio data.

The encoding/decoding unit 41 has a decoding function (reproduction function) for separating the image data, the audio data and the like from the compression data and decoding the image data and the audio data into an image signal and an audio signal.

The encoding/decoding unit 41 performs automatic white balance control, exposure correction control and enlargement control according to a digital zoom magnification ratio with respect to the image signal supplied from the image signal processing unit 34, based on the control signal from the control unit 10.

The disc interface 42 writes the compression data supplied from the encoding/decoding unit 41 in the storage device 44. The disc interface 42 reads from the storage device 44 and supplies the compression data to the encoding/decoding unit 41. The storage device 44 may be an optical disc such as a Digital Versatile Disc Recordable (DVD-R) or a Blu-Ray Disc (BD) (registered trademark).

The output processing unit 45 is controlled by a main control unit 100 through a system bus 109. The output processing unit 45 supplies the compression data supplied from the encoding/decoding unit 41 to the control unit 10 or an editing device 200. The editing device 200 may be, for example, an information processing device connected to the imaging device 1 through an output terminal included in the output processing unit 45. The user may edit image data or audio data using the editing device 200.

The buffer memory 46 includes, for example, an SDRAM or the like and is used as a working area for encoding or decoding of the encoding/decoding unit 41.

As shown in FIG. 7, the control unit 10 includes the main control unit 100, a Read Only Memory (ROM) 101, a Random Access Memory (RAM) 102, an operation input interface 103 for receiving the operation input from the operation input unit 20 or the touch panel 12, a display control unit 104 for controlling the touch panel 12, a memory card interface 105 in which a memory card 14 is loaded, a clock circuit 106 for generating time information used to record a photographing time, a sensor control unit 107 for controlling the distance sensor 16 and a projector control unit 108 for controlling the projector module 18, all of which are connected through the system bus 109.

The main control unit 100 serves to perform the overall process of the imaging device 1 and uses the RAM 102 as a working area. The main control unit 100 performs control according to an operation mode designated by the user operation of the mode operation unit 24.

For example, if the operation mode is an imaging mode, the main control unit 100 stops supply of power to the projector control unit 108 and the projector module 1E and displays the image signal supplied from the image signal processing unit 34 on the touch panel 12 through the display control unit 104.

If the operation mode is a reproduction mode, the main control unit 100 stops supply of power to the photographing mode 30, generates the reproduction screen P or the index screen I based on the thumbnail or the reproduction signal of the image data supplied from the encoding/decoding unit 41, and displays the reproduction screen P or the index screen I on the touch panel 12 through the display control unit 104.

In the ROM 101, a program for controlling the photographing unit 30 or a program for executing recording control and reproduction control of an image signal or an audio signal is written.

The operation input interface 103 sends the operation signal from the connected operation input unit 20 and touch panel 12 to the main control unit 100. The zoom operation unit 21, the manual operation unit 22, the still image capturing operation unit 23, the mode operation unit 24, the projection switch operation unit 25 and the like shown in FIG. 1 are collectively referred to as the operation input unit 20.

The display control unit 104 controls the display of the image signal supplied from the image signal processing unit 34 or the reproduction screen P, the index screen I or the like generated by the main control unit 100 on the touch panel 12.

The memory card interface 105 writes the compression data supplied from the encoding/decoding circuit 41 in the memory card 14. The memory card interface 105 reads the compression data from the memory card 14 and supplies the compression data to the encoding/decoding circuit 41.

The clock circuit 106 generates time information indicating the year, month, day, hours, minutes, seconds and the like.

Figures 8, 9:
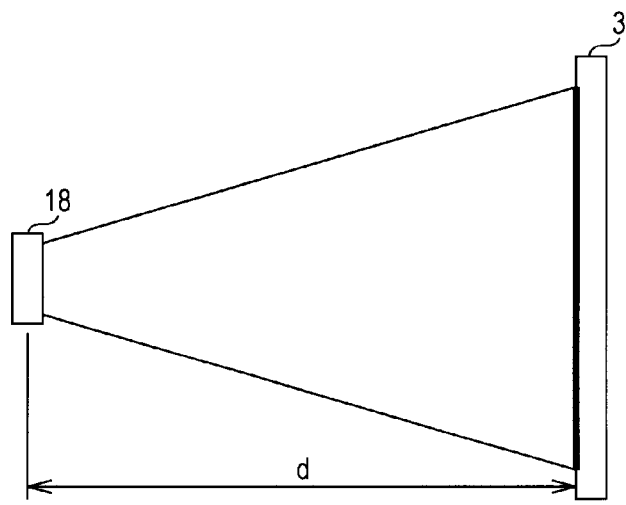
FIG. 8 is an explanatory view showing a projection distance detected by a distance sensor.
FIG. 9 is an explanatory view showing a detailed example of a relationship between a projection distance and the number of arranged thumbnails.

The sensor control unit 107 performs control for detecting the distance from the projection surface 3 by the distance sensor 16. The distance sensor 16 detects t1-.e distance between the distance sensor 16 and the projection surface 3 under the control of the sensor control unit 107. Since the distance sensor 16 is provided on the same Surface as the projector module in the same direction, the distance detected by the distance sensor 16 is equivalent to the projection distance d between the projection surface 3 and the projection module 8 as shown in FIG. 8.

The projector control unit 108 performs control for projecting the screen from the projector module 18 onto the projection surface 3. Under the control of the projector control unit 108, for example, the reproduction screen P or the index screen I is projected from the projector module 18 onto the projection surface 3.

Control of Number of Thumbnails on Index Screen I

If the index screen I is projected from the projector module 18, the main controller 100 controls the number of arranged thumbnails on the index screen I according to the projection distance d detected by the distance sensor 16. For example, the main controller 100 may control the number of thumbnails arranged on the index screen I according to a predetermined relationship between the projection distance d and the number of arranged thumbnails.

FIG. 9 is an explanatory view showing a detailed example of a relationship between the projection distance d and the number of arranged thumbnails. In the example shown in FIG. 9, the projection distance d "less than 1.0 m" is associated with the number of arranged thumbnails "3×3", the projection distance d "equal to or greater than 1.0 m and less than 1.5 m" is associated with the number of arranged thumbnails "4×4", the projection distance d "equal to or greater than 1.5 m and less than 2.0 m" is associated with the number of arranged thumbnails "5×5", and the projection distance d "equal to or greater than 2.0 m" is associated with the number of arranged thumbnails "6×6".

The main control unit 100 increases the number of arranged thumbnails on the index screen I as the projection distance d is increased, for example, according to the relationship shown in FIG. 9. Hereinafter, this will be described in greater detail with reference to FIGS. 10 and 11.

Figure 10:
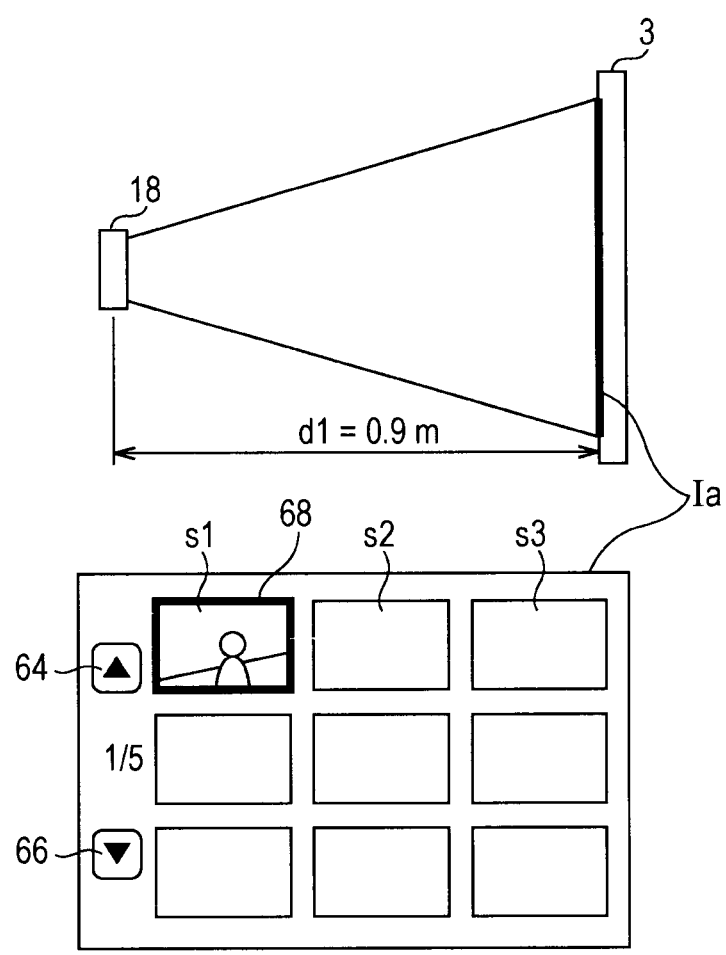
FIG. 10 is an explanatory view showing a detailed example of an index screen generated by a main control unit.
Figure 11:
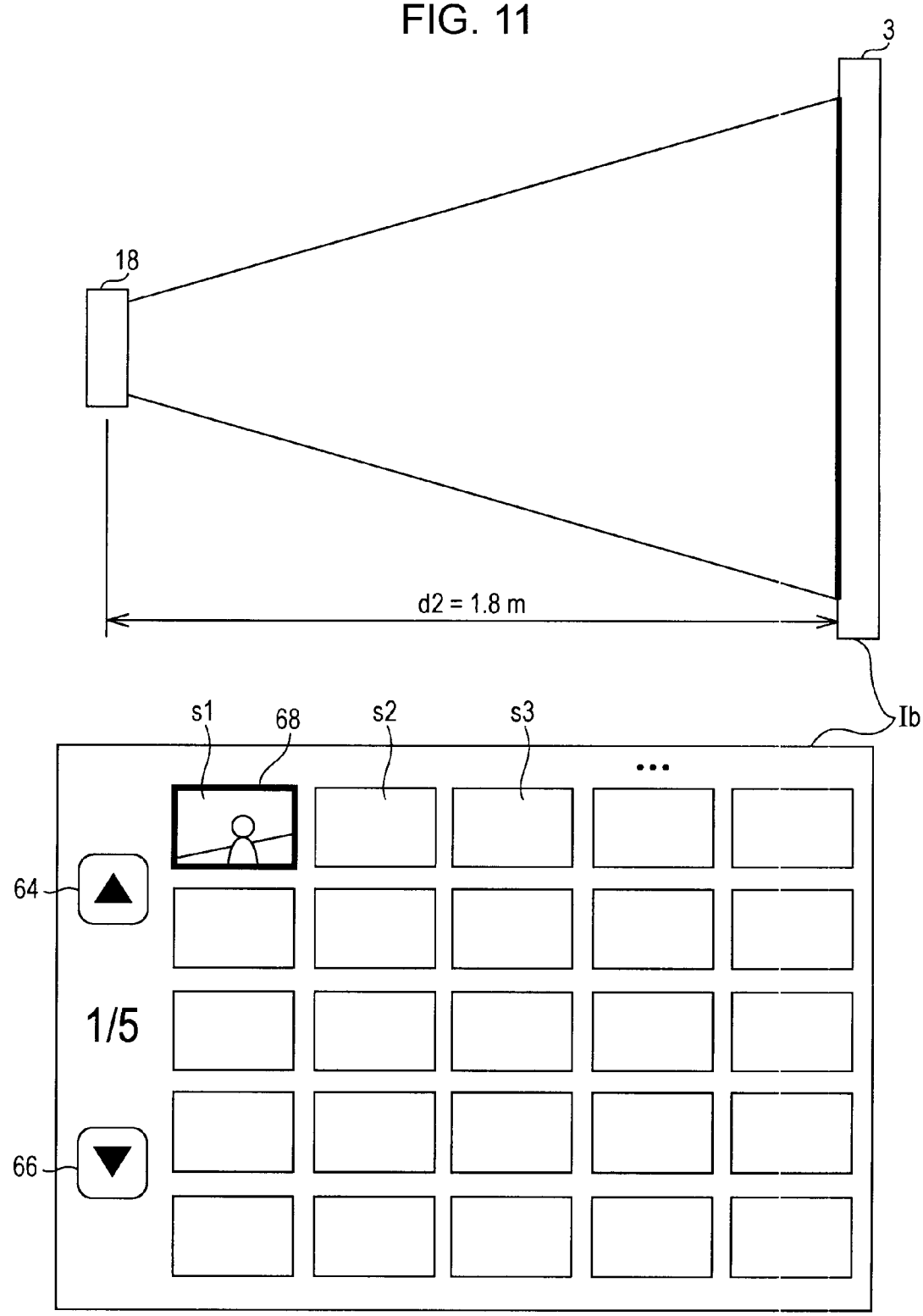
FIG. 11 is an explanatory view showing a detailed example of an index screen generated by a main control unit.

FIGS. 10 and 11 are explanatory views showing detailed examples of the index screen I generated by the main control unit 100. As shown in FIG. 10, if the projection distance d1 is 0.9 m, the main control unit 100 generates an index screen Ia in which thumbnails are arranged "3×3" according to the relationship shown in FIG. 9 and projects the screen from the projector module 18.

In contrast, as shown in FIG. 11, if the projection distance d2 is 1.8 m, the main control unit 100 generates an index screen Ib in which thumbnails are arranged "5×5" according to the relationship shown in FIG. 9 and projects the screen from the projector module 18.

As shown in FIG. 11, the index screen Ib includes thumbnails greater in number than the number of thumbnails of the index screen Ia, but the display size of the projection surface 3 is greater than that of the index screen Ia, thereby securing visibility of the thumbnails.

Display of Touch Panel During Projection

The main control unit 100 performs display control of the touch panel 12 during projection of the index screen I. For example, the main control unit 100 may control the display of the index screen I during projection on the touch panel 12. Alternatively, the main control unit 100 may not display the index screen I during projection on the touch panel 12. For example, as shown in FIG. 12, the main control unit 100 may display a screen different from the index screen I during projection on the touch panel 12.

Figure 12:
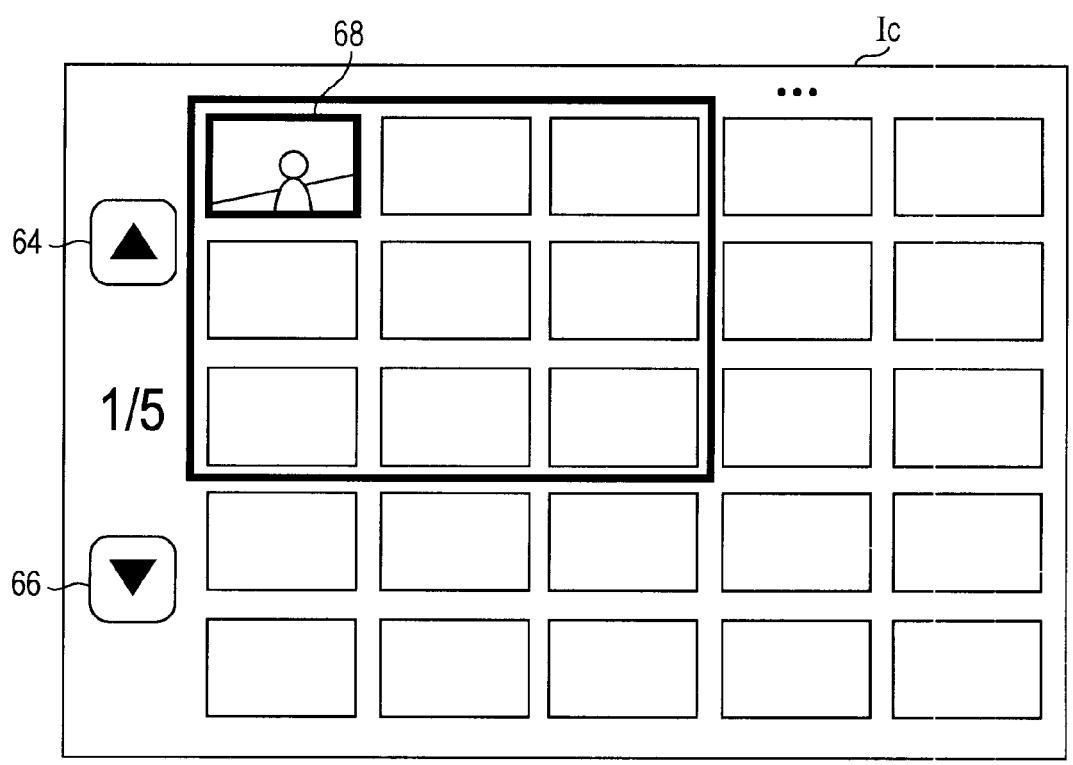
FIG. 12 is an explanatory view showing an example of an index screen displayed on a touch panel during projecting the index screen shown in FIG. 10.

FIG. 12 is an explanatory view showing an example of an index screen Ic displayed on the touch panel 12 during projection of the index screen Ia shown in FIG. 10. As shown in FIG. 12, the index screen IC displayed on the touch panel 12 includes a plurality of thumbnails and a rectangular indicator 69 representing a thumbnail included in the index screen Ia during projection among the plurality of thumbnails.

The user may change the thumbnail included in the index screen during projection by moving the rectangular indicator 69. For example, if the rectangular indicator 69 is moved by the user, the main control unit 100 may generate an index screen including the thumbnail in the range of the rectangular indicator 69 after movement and project the index screen from the projector module 18.

User Operation During Projection

The touch panel 12 may also display the index screen I during projection so as to select image data to be played back by user operation on the touch panel 12. However, if the number of thumbnails included in the index screen I is increased as the projection distance d is increased, since the display size of each thumbnail on the touch panel 12 is decreased, it is difficult to perform the selection operation of a thumbnail on the touch panel 12.

Therefore, hereinafter, first to third methods of easily selecting a thumbnail during projection of the index screen I will be proposed.

First Method

Figure 13:
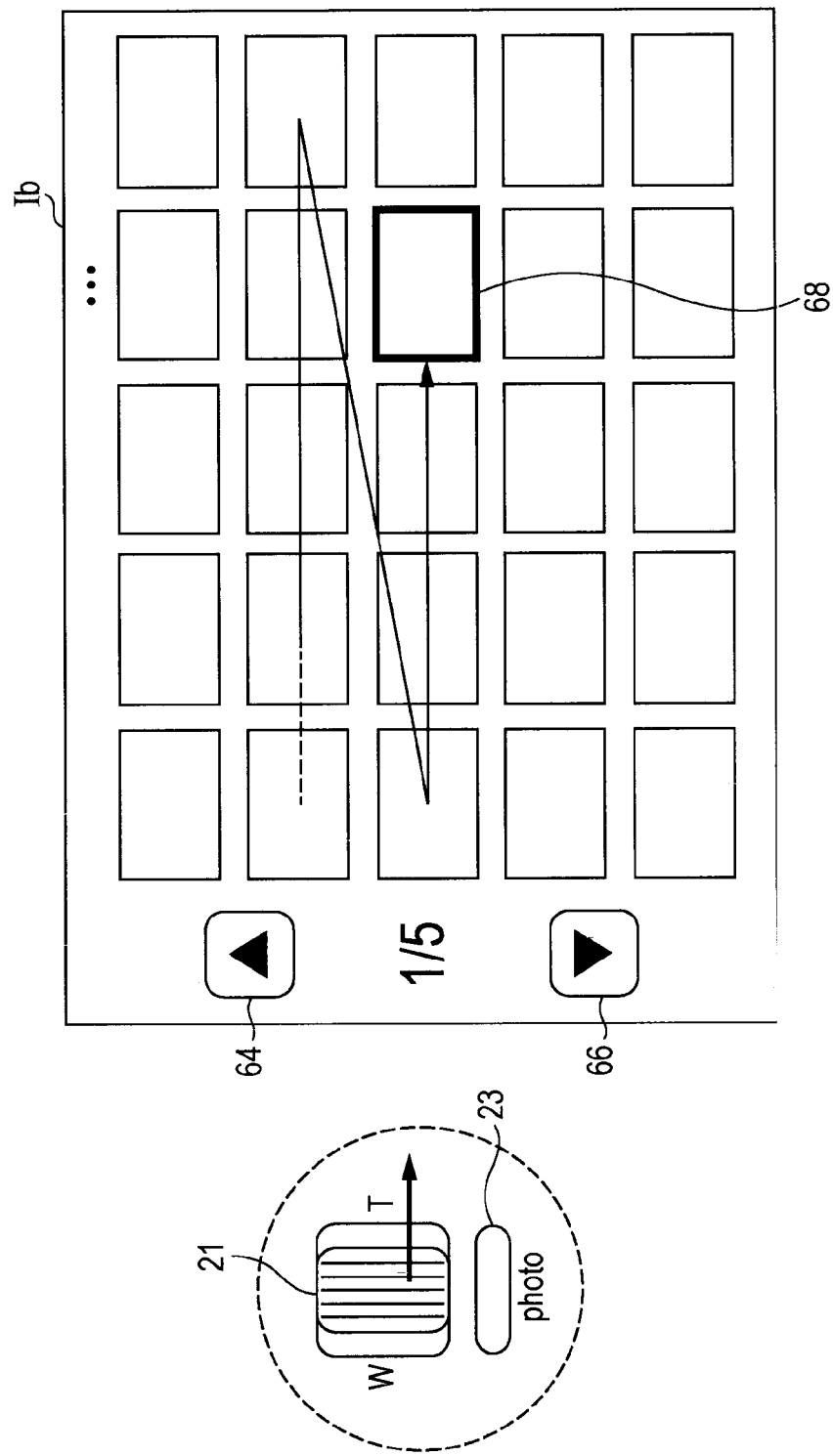
FIG. 13 is an explanatory view showing a first method for selecting a thumbnail.

FIG. 13 is an explanatory view showing a first method of selecting a thumbnail. In the first method, as shown in FIG. 13, a thumbnail is selected by user operation for the zoom operation unit 21 and the still image capturing operation unit 23. More specifically, while the zoom operation unit 21 is tilted to the telephoto side, a cursor 68 moves from the left to the right and moves to a leftmost thumbnail of a next stage after reaching a rightmost thumbnail, as shown by an arrow of FIG. 13.

When the still image capturing operation unit 23 is pressed, a thumbnail on which the cursor 68 is put is selected and a reproduction screen of content data corresponding to the thumbnail is generated by the main control unit 10.

Figure 14:
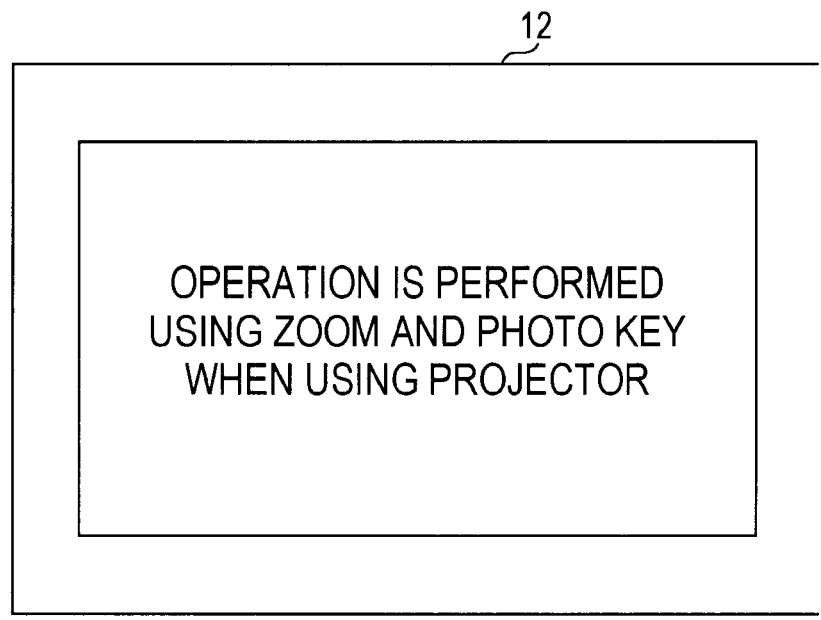
FIG. 14 is an explanatory view showing a detailed example of an induction screen for inducing a user operation.

During the projection of the index screen I, for example, the touch panel 12 may display a screen for inducing the user to perform the operation of the zoom operation unit 21 and the still image capturing operation unit 23, as shown in FIG. 14.

The user may adjust a projection direction by rotating the opening/closing unit 8 around the first rotation axis L1 and the second rotation axis L2. However, upon adjustment, the user involuntarily touches the touch panel 12. Therefore, the imaging device 1 may set the touch panel 12 to a state in which user operation is not received during projection of the screen.

Second Method

Although the method of selecting the thumbnail using the zoom operation unit 21 and the still image capturing operation unit 23 is described in the first method, the operation input unit 20 used to select the thumbnail is not limited to the zoom operation unit 21 and the still image capturing operation unit 23. For example, as a second method, a thumbnail in the index screen I may be selected by a rotation operation of the manual operation unit 22.

Third Method

Although the method of selecting the thumbnail using the operation input unit 20 is described in the first and second methods, as a third method, a thumbnail in the index screen I may be selected by an operation for the touch panel 12.

Figure 15:
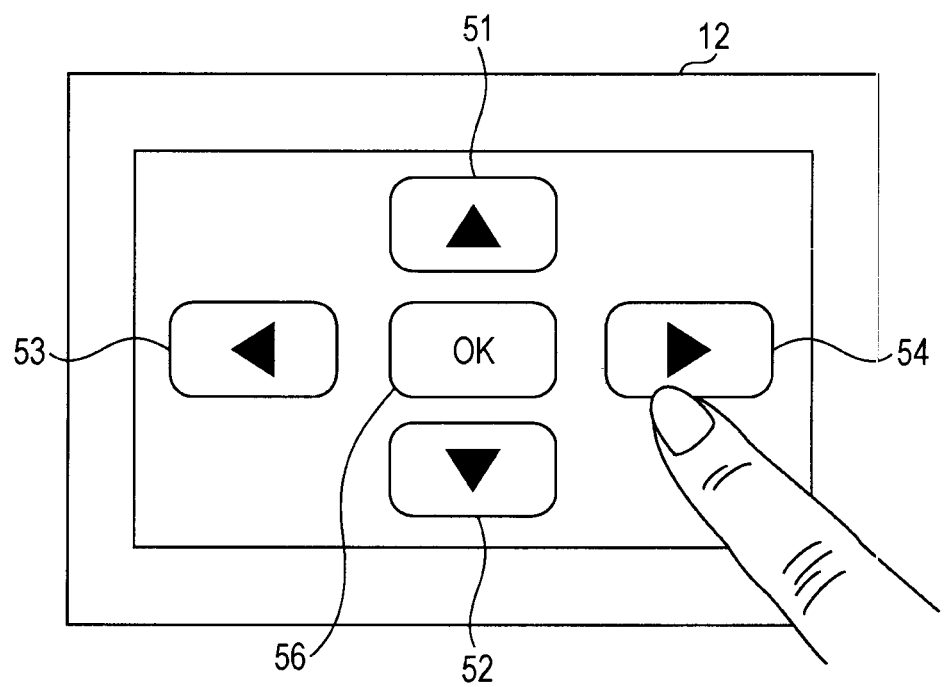
FIG. 15 is an explanatory view showing a third method for selecting a thumbnail.

FIG. 15 is an explanatory view showing the third method of selecting the thumbnail. In the third method, during projection of the index screen I, the touch panel 12 displays, for example, a screen for selecting a thumbnail shown in FIG. 15. The screen for selecting the thumbnail includes an upper button 51, a lower button 52, a left button 53, a right button 54 and an OK button 56. The user presses the upper button 51, the lower button 52, the left button 53 or the right button 54 so as to move a cursor 38 on the index screen I and presses the OK button 56 so as to decide the selection of the thumbnail on which the cursor 38 is put.

2-2. Modified Example of Configuration of Imaging Device

Modified Example 1

The example in which the main control unit 100 controls the number of arranged thumbnails on the index screen I, for example, according to the relationship shown in FIG. 5 was described above. However, if the projection distance d is close to a boundary value for changing the number of arranged thumbnails, such as 1.0 m or 1.5 m, for example, the number of arranged thumbnails may be frequently changed by deviation in distance detection by the distance sensor 16.

Thus, the main control unit 100 may increase the range including the current projection distance d to at least any one of an upper side or a lower side thereof. For example, the main control unit 100 may increase the range "equal to or greater than 1.0 m and less than 1.5 m" to a range "equal to or greater than 0.9 m and less than 1.5 m", if the projection distance d is 1.1 m. If the projection distance d is less than 0.9 m, the number of arranged thumbnails is changed from "4×4" to "3×3", but the threshold which returns the number of arranged thumbnails to "4×4" is 1.0 m. Accordingly, even when the projection distance d is slightly changed, since a gap is present between 0.9 m and 1.0 m, the main control unit 100 may maintain the number of arranged thumbnails of "3×3".

That is, the main control unit 100 increases the number of thumbnails from a first number to a second number when the projection distance d exceeds a first threshold and decreases the number of thumbnails from the second number to the first number when the projection distance d is less than a second threshold less than the first threshold, thereby suppressing a case where the number of arranged thumbnails is frequently changed.

Modified Example 2

Although the example of including the distance sensor 16 in the imaging sensor 1 as the distance detection unit for detecting the projection distance d is described above, the distance detection unit is not limited to the distance sensor 16. For example, the distance between the subject and the imaging device 1 may be estimated based on a focal length of the imaging optical system 31 when an image signal supplied from the photographing unit 30 is focused. If the imaging optical system 31 and the projector module are directed to the same direction, the distance between the subject and the imaging device 1 is treated as being substantially equivalent to the projection distance d.

Therefore, the main controller 100 may determine whether or not the image signal supplied from the photographing unit 30 is focused and decide the projection distance d based on the focal length of the imaging optical system 31 if the image signal is focused. In this way, the imaging optical system 31 and the main control unit 100 may cooperatively perform the function of the distance detection unit.

2-3. Operation of Imaging Device

The configuration of the imaging device 1 according to the first embodiment of the present disclosure was described above. Next, the operation of the imaging device 1 according to the first embodiment of the present disclosure will be described with reference to FIG. 16 or 17.

Figure 16:
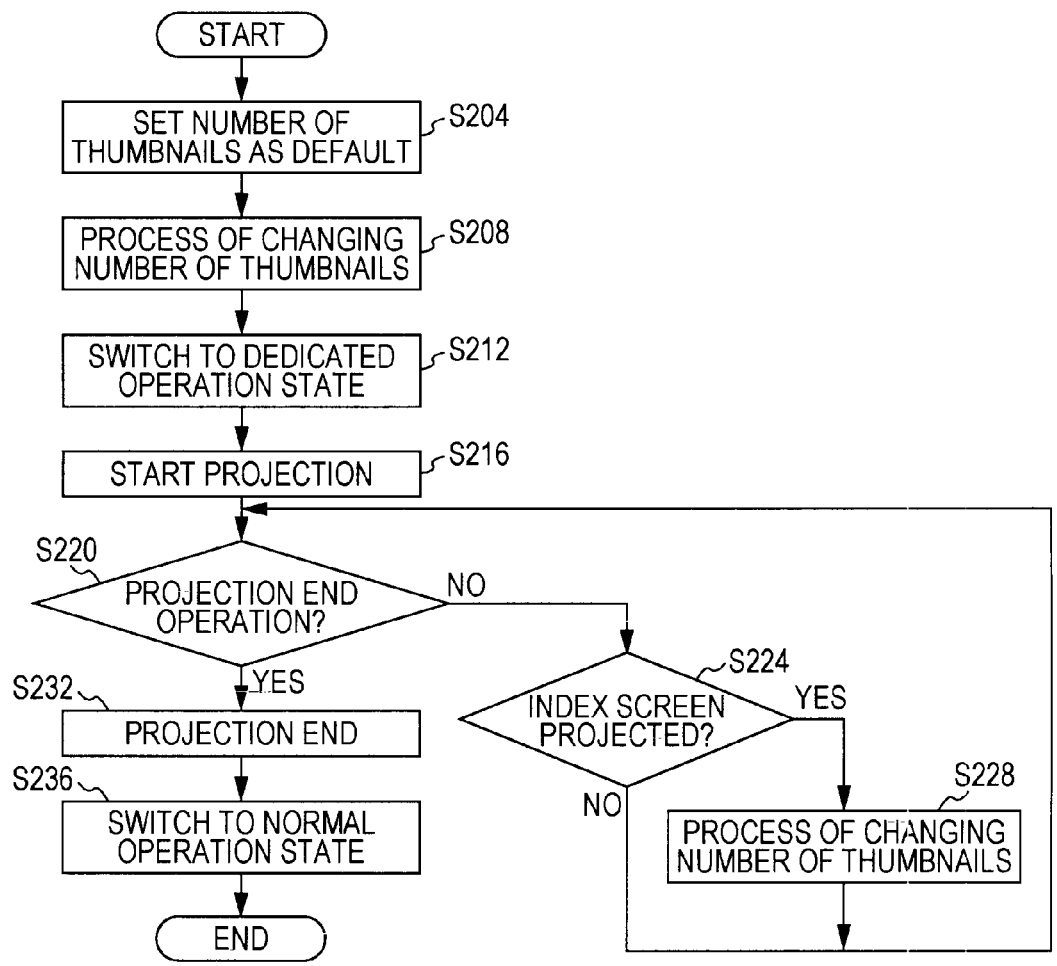
FIG. 16 is a flowchart showing the overall operation of an imaging device according to a first embodiment of the present disclosure.

FIG. 16 is a flowchart illustrating the overall operation of the imaging device 1 according to the first embodiment of the present disclosure. As shown in FIG. 16, when the user performs a projection start operation, the main control unit 100 sets the number of thumbnails on the index screen I as a default (S204). This is a process for preparation for the failure of a subsequent process of changing the number of thumbnails. Thereafter, the main control unit 100 performs the process of changing the number of thumbnails (S208) and switches a user operation reception state to a dedicated operation state (S212). The dedicated operation state may be, for example, a state of receiving a thumbnail selection operation for the operation input unit 20, as described as "user operation during projection". Details of the process of changing the number of thumbnails will be described below with reference to FIG. 17.

Subsequently, the main control unit 100 controls the projector module 18 to start projection (S216). The main control unit 100 appropriately executes the process of changing the number of thumbnails during projection of the index screen I (S224 and S228) until the user performs a projection end operation (S220). The imaging device 1 may perform the process of changing the number of thumbnails only under a specific condition. For example, since it is cumbersome that the number of thumbnails is changed during the user operation, if there is a user operation, the process of changing the number of thumbnail may not be performed until a predetermined time is elapsed.

Thereafter, if projection of the projector module 18 is ended (S232), the main control unit 100 switches the user operation reception state to a normal operation state (S236). The normal operation state may be a state for receiving the user operation for the touch panel 12.

Figure 17:
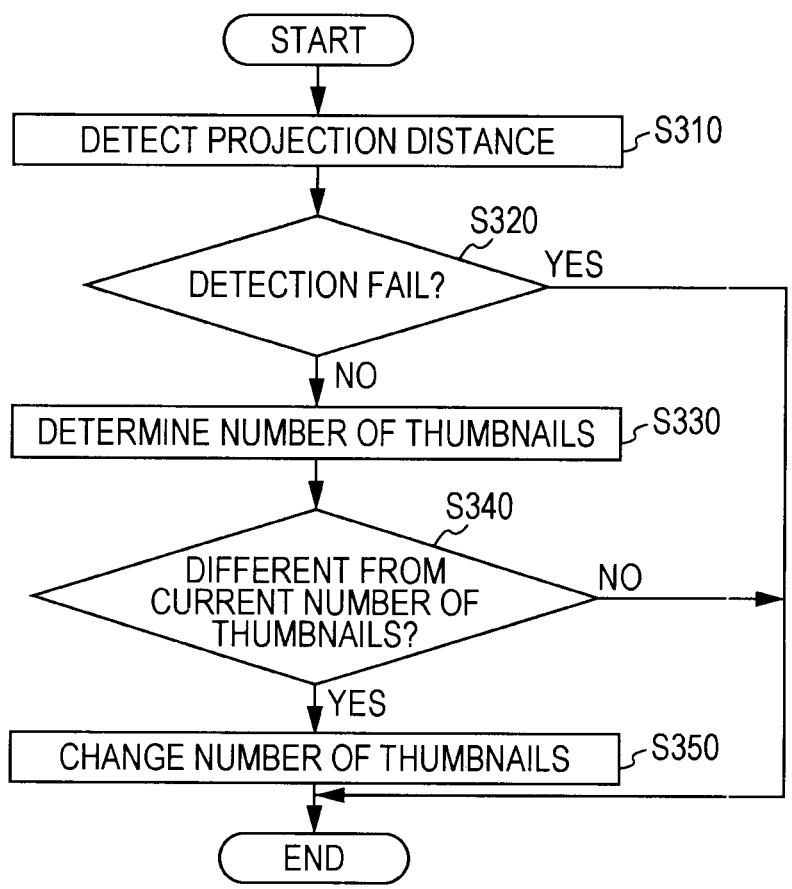
FIG. 17 is a flowchart illustrating an operation of a process of changing the number of thumbnails.

FIG. 17 is a flowchart illustrating an operation of a process of changing the number of thumbnails. As shown in FIG. 17, in the process of changing the number of thumbnails, first, the distance sensor 16 attempts to detect the projection distance d (S310). If the detection of the projection distance d by the distance sensor 16 succeeds (S320), the main control unit 100 determines the number of thumbnails, for example, according to the relationship between the projection distance d and the number of thumbnails shown in FIG. 9 (S330). If the number of thumbnails determined in S320 is different from the current number of thumbnails (S340), the main control unit 100 changes the number of thumbnails to the number of thumbnails determined in S330 (S350).

In contrast, if the detection of the projection distance d by the distance sensor 16 fails (S320) or if the number of thumbnails determined in S320 is equal to the current number of thumbnails (S340), the main control unit 100 maintains the current number of thumbnails without changing the number of thumbnails.

3. Second Embodiment

Next, a second embodiment of the present disclosure will be described. Although the example in which the index screen I includes the plurality of thumbnails is described in the first embodiment, an index screen I including a selection item of content data including text information will be described in the second embodiment.

In this case, the main control unit 100 controls the number of selection items of the index screen I according to the projection distance d. For example, the main control unit 100 increases the number of selection items of the index screen I as the projection distance d is increased, based on the same purpose as the first embodiment. Hereinafter, this will be described in greater detail with reference to FIG. 18.

FIG. 18 is an explanatory view showing a detailed example of the index screen I according to the second embodiment. As shown in FIG. 18, in a state in which the index screen Ix including four selection items is projected, if the projection distance d is increased, the main control unit 100 increases, for example, the number of selection items to 8 and generates an index screen Ix'. As shown in FIG. 18, the main control unit 100 may add information indicating "reproduction time" to each selection item so as to generate the index screen Ix'.

By the associated configuration, it is possible to control the amount of information from the index screen I to the user while securing visibility of each selection item including text information.

4. Third Embodiment

Next, a third embodiment of the present disclosure will be described. The main control unit 100 according to the third embodiment controls the kind of information arranged on the index screen I according to the projection distance d. For example, the main control unit 100 increases the number of kinds of information arranged on the index screen I as the projection distance d is increased, based on the same purpose as the first embodiment. Hereinafter, this will be described in greater detail with reference to FIG. 19.

FIG. 19 is an explanatory view showing a detailed example of the index screen I according to the third embodiment. As shown in FIG. 19, in a state in which the index screen Iy including 9 thumbnails is projected, if the projection distance d is increased, the main control unit 100 adds text information corresponding to each thumbnail while maintaining the number of thumbnails of 9 so as to generate an index screen Iy'. As the text information, the main control unit 100 may add an image capturing date and time, a title name, or the like of the content data corresponding to each thumbnail, as shown in FIG. 19.

By the associated configuration, it is possible to control the amount of information from the index screen I to the user while securing visibility of the projected index screen I.

5. Overview

As described above, according to the first embodiment of the present disclosure, since the number of thumbnails on the index screen is automatically exchanged, it is possible to improve user convenience. Since the number of thumbnails is determined according to the projection distance, it is possible to secure visibility of each thumbnail on the index screen.

By changing the selection operation method of the thumbnail depending on whether or not the screen is being projected, it is possible to maintain operability even when the number of thumbnails included in the projected index screen is increased. During projection of the screen, for example, a user operation for the zoom operation unit 21, the still image capturing operation unit 23, or the like used for photographing is received so as to avoid addition of a new operation device.

As described in the second embodiment or the third embodiment of the present disclosure, it is possible t:o control text information arranged on the index screen I according to the projection distance and control the kind of information arranged on the index screen I according t:o the projection distance.

Although the exemplary embodiments of the present disclosure are described in detail with reference to the accompanying drawings, the present disclosure is not limited to the associated examples. It will be apparent to those skilled in the art that various modified examples or changed examples are made without departing from the technical spirit of the claims and are included in the technical range of the present disclosure.

For example, the steps of the process of the imaging device 1 of the present specification may not necessarily be performed time series according to the order described in the flowchart. For example, the steps of the process of the imaging device 1 may be performed in order different from the order described in the flowchart or may be performed in parallel.

Hardware mounted in the imaging device 1 may create a computer program for performing the same functions as the components of the above-described imaging device 1. A storage medium which stores the computer program is provided.

The present disclosure contains subject matter related to that disclosed in Japanese Priority Patent Application JP 2010-214655 filed in the Japan Patent Office on Sep. 27, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection control device, comprising:
    circuitry configured to:
       control a projection of a screen on a projection surface,
          wherein the screen displays at least one thumbnail,
          wherein the projection surface is at a first distance from a projection device, and
          wherein the projection device projects the screen on the projection surface; and
       control the projection of the screen on the projection surface, based on a first increase in the first distance to a second distance between the projection device and the projection surface, to further display information corresponding to the at least one thumbnail on the projection surface.

2. The projection control device according to claim 1, wherein the circuitry is further configured to:
    control a display size of the at least one thumbnail of the projected screen such that the display size at the first distance is same as the display size at the second distance; and
    control addition of the at least one thumbnail on the projected screen such that the information corresponding to the at least one thumbnail is maintained on the projected screen.

3. The projection control device according to claim 1, wherein the circuitry is further configured to control a number of the at least one thumbnail of the projected screen based on one of a first relationship between the first distance and the number of the at least one thumbnail or a second relationship between a size of an area of the projected screen and the number of the at least one thumbnail.

4. The projection control device according to claim 3, wherein the circuitry is further configured to:
    increase the number of the at least one thumbnail from a first number to a second number based on the first distance between the projection device and the projection surface,
       wherein the first distance is greater than a first threshold distance; and
    decrease the number of the at least one thumbnail from the second number to the first number based on the first distance between the projection device and the projection surface,
       wherein the first distance is less than a second threshold distance.

5. The projection control device according to claim 1, further comprising:
    an operation input control unit configured to control at least one of a tiltable lever, a dial, or a pressing button; and
    an operation display control unit comprising a touch panel,
       wherein the touch panel is configured to:
          display an image; and
          detect an operation,
       wherein, based on the projection of the screen, the operation input control unit is further configured to receive a user input, and
       wherein, based on display of the screen by the touch panel, the operation display control unit is configured to receive the user input.

6. The projection control device according to claim 5, wherein the touch panel is further configured to display an induction screen to receive the user input, based on the projection of the screen, and
    wherein the user input is received through the operation input control unit.

7. The projection control device according to claim 1, wherein the information displayed on the projected screen includes text information, and
    wherein the circuitry is further configured to control, based on one of the first distance between the projection device and the projection surface or a size of an area of the projected screen, an amount of the text information included in the projected screen.

8. The projection control device according to claim 1, further comprising an imaging device,
    wherein the circuitry is further configured to detect a third distance of the projection surface from a focal length of the imaging device.

9. A projection control method, comprising:
    in a projection device configured to project a screen:
       controlling a projection of the screen on a projection surface,
          wherein the screen displays at least one thumbnail,
          wherein the projection surface is at a first distance from a projection device, and
          wherein the projection device projects the screen on the projection surface; and
       controlling the projection of the screen on the projection surface, based on a first increase in the first distance to a second distance between the projection device and the projection surface, to further display information corresponding to the at least one thumbnail on the projection surface.

10. A non-transitory computer-readable storage medium having stored thereon, computer-executable instructions, which when executed by a computer, causes the computer to execute operations, the operations comprising:
    controlling a projection of a screen on a projection surface,
       wherein the screen displays at least one thumbnail,
       wherein the projection surface is at a first distance from a projection device, and
       wherein the projection device projects the screen on the projection surface; and controlling the projection of the screen on the projection surface, based on a first increase in the first distance to a second distance between the projection device and the projection surface, to further display information corresponding to the at least one thumbnail on the projection surface.

11. The projection control device according to claim 1, wherein a number of the at least one thumbnail on the projected screen is configured to increase with an increase in the first distance between the projection device and the projection surface with prevention of decrease of a display size of the at least one thumbnail.

12. The projection control device according to claim 11, wherein, based on a detection of a user operation and an elapse of a first time period, the number of the at least one thumbnail on the projected screen remains unchanged.

13. The projection control device according to claim 1, wherein the first distance between the projection device and the projection surface is detected by a detection device.

14. The projection control device according to claim 1, wherein the projection surface is a surface on a focal plane of the projection device.

15. A display control device, comprising:
 circuitry configured to:
  control a projection of a screen on a projection surface,
   wherein the screen displays at least one thumbnail,
   wherein the projection surface is at a first distance from a projection device, and
   wherein the projection device projects the screen on the projection surface; and
  control the projection of the screen on the projection surface, based on a first increase in the first distance to a second distance between the projection device and the projection surface, to further display information corresponding to the at least one thumbnail on the projection surface.

16. The display control device according to claim 15, wherein the circuitry is further configured to:
 control a display size of the at least one thumbnail of the projected screen such that the display size at the first distance is same as the display size at the second distance,
  wherein the second distance is greater than the first distance; and
 control addition of the at least one thumbnail on the projected screen such that the information corresponding to the at least one thumbnail is maintained on the projected screen.

17. The display control device according to claim 15, wherein the circuitry is further configured to control a number of the at least one thumbnail displayed on the projected screen based on one of a first relationship between the number of the at least one thumbnail displayed and the first distance between the projection device and the projection surface or a second relationship between a size of an area of the projected screen and the number of the at least one thumbnail.

18. The display control device according to claim 15, wherein the circuitry is further configured to:
 increase a number of the at least one thumbnail from a first number to a second number based on the first distance between the projection device and the projection surface,
  wherein the first distance is greater than a first threshold distance; and
 decrease the number of the at least one thumbnail from the second number to the first number based on the first distance between the projection device and the projection surface,
  wherein the first distance is less than a second threshold distance.

19. The display control device according to claim 15, further comprising:
 an operation input control unit configured to control at least one of a tiltable lever, a dial, or a pressing button; and
 an operation display control unit comprising a touch panel, wherein the touch panel is configured to:
  display an image; and
  detect an operation,
 wherein, based on the projection of the screen, the operation input control unit is further configured to receive a user input, and
 wherein, based on display of the screen by the touch panel, the operation display control unit is configured to receive the user input.

20. The display control device according to claim 19, wherein the touch panel is further configured to display an induction screen to receive the user input, based on the projection of the screen, and
 wherein the user input is received through the operation input control unit.

21. The display control device according to claim 15, further comprising an imaging device,
 wherein the circuitry is further configured to detect a third distance of the projection surface from a focal length of the imaging device.

22. The display control device according to claim 15, wherein a size of the projected screen corresponds to the first distance between the projection device and the projected surface.

23. The display control device according to claim 15, wherein the information displayed on the projected screen includes text information, and
 wherein the circuitry is further configured to control, based on one of the first distance between the projection device and the projection surface or a size of an area of the projected screen, an amount of the text information included in the projected screen.

* * * * *